(12) United States Patent
Funatsu et al.

(10) Patent No.: US 6,631,217 B1
(45) Date of Patent: Oct. 7, 2003

(54) IMAGE PROCESSOR

(75) Inventors: Eiichi Funatsu, Tokyo (JP); Souichiro Kuramochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/306,796

(22) Filed: May 7, 1999

(30) Foreign Application Priority Data

Dec. 22, 1998 (JP) ............................................ 10-365256

(51) Int. Cl.$^7$ .............................. G06K 7/08; G06K 9/22; H04N 3/14
(52) U.S. Cl. ....................... 382/307; 382/320; 382/315; 382/206; 348/294; 348/249; 348/236; 345/177
(58) Field of Search ................................. 382/307, 312, 382/317, 318, 206, 174, 235, 240, 243, 244, 277, 278, 313, 315, 322, 323, 324, 286, 320; 348/227.1, 230.1, 236, 238, 249, 272, 294, 813; 345/165, 166, 177

(56) References Cited

U.S. PATENT DOCUMENTS

| | | | | |
|---|---|---|---|---|
| 4,380,755 A | * | 4/1983 | Endlicher et al. | ............ 382/324 |
| 4,821,108 A | * | 4/1989 | Brabagelata et al. | ......... 358/282 |
| 5,668,631 A | * | 9/1997 | Norita et al. | ................ 356/376 |
| 5,694,495 A | * | 12/1997 | Hara et al. | ................... 382/324 |

FOREIGN PATENT DOCUMENTS

| | | |
|---|---|---|
| JP | 5111010 | 4/1993 |
| JP | 5316427 | 11/1993 |
| JP | 8294057 | 11/1996 |
| JP | 1093358 | 4/1998 |

* cited by examiner

Primary Examiner—Bhavesh M. Mehta
Assistant Examiner—Yosef Kassa
(74) Attorney, Agent, or Firm—Leydig, Voit & Mayer, Ltd.

(57) ABSTRACT

An image processor includes unit pixel circuits, each circuit outputting a pixel value, according to incident light, to an output line; and read circuits in each row and each column, each of which can read out a pixel value of each unit pixel circuit and a result of computing for projection for each row and each column. The unit pixel circuits of each row and column and the corresponding read circuits are connected to each other by discrete output lines. The result of computing for projection readout by the compression processing is an average of pixel values in the unit pixel circuits of each row and of each column.

13 Claims, 12 Drawing Sheets

IMAGE PROCESSOR

FIELD OF THE INVENTION

The present invention relates to an image processor for selectively processing for output a two-dimensional image projected onto an image sensor or compressing the two-dimensional image.

BACKGROUND OF THE INVENTION

Description is made hereinafter for an image processor based on the conventional technology. It should be noted that the description of ordinary processing for outputting a two-dimensional image projected onto an image sensor is omitted herein. As literature related to the image processor based on the conventional technology which can output projection data for a two-dimensional image, for example, there is Japanese Patent Laid-Open Publication No. HEI 10-093358.

FIG. 10 shows a configuration of an image processor based on the conventional technology. In FIG. 10, designated at the reference numeral 101 is a plurality of unit pixel circuits connected to each other in an array each for outputting a pixel value for one pixel to output lines 103 and 104, at 102 a vertical scanning circuit for scanning the unit pixel circuits 101 in the vertical direction, at 105 a plurality of offset read circuits provided in each column for inverting either one of the output lines 103 and 104 and connected to the output terminal 106 through a transmission gate, and at 107 a horizontal scanning circuit for scanning the plurality of offset read circuits 105 in the horizontal direction.

FIG. 11 shows a circuit configuration of the unit pixel circuit 101. In FIG. 11, designated at the reference numeral 113 is an optoelectronic transducer for accumulating electric charge of the pixel generated due to the incident light and changing an output potential according to the amount of light, at 112 a MOS transistor for resetting the optoelectronic transducer to a source potential 111, at 115 and 116 are transistors for negative and positive output respectively for outputting a current flowing through the MOS transistor 114.

Description is made hereinafter for the operation so as to obtain projection data for a two-dimensional image in the conventional type of image processor configured as described above. At first, each optoelectronic transducer 113 of each of the unit pixel circuits 101 is reset to a source potential 111 (by controlling a signal Vr in the figure). In this state, conductance of the MOS transistor 114 is changed as the electric charge is accumulated in the optoelectronic transducer 113 due to the incident light.

The MOS transistor 114 amplifies output of the optoelectronic transducer 113, and further a current flowing through the MOS transistor 114 is outputted to an output terminal 117 (corresponding to a signal Vout1 in the figure) or 118 (corresponding to a signal Vout2 in the figure) under the control of the transistor 115 for negative output or the transistor 116 for positive output (by controlling a signal Vn or a signal Vp in the figure is controlled) by the vertical scanning circuit 102.

Then, when each signal Vn or signal Vp in all the rows is scanned by the vertical scanning circuit 102, each data corresponding to a total sum of currents from all the unit pixel circuits in each column, namely a total sum of pixel values according to the amount of incident light is obtained in each offset read circuit 105. Then, a one-dimensional projection, namely a projection of a light pattern irradiated onto the two-dimensional unit pixel circuit can be obtained through scanning by the horizontal scanning circuit 107. As another literature related to the image processor based on the conventional technology which can output projection data for a two-dimensional image, for example, there is Japanese Patent Laid-Open Publication No. HEI 5-111010. It should be noted that the description of ordinary processing for outputting a two-dimensional image projected onto an image sensor is omitted herein.

FIG. 12 shows a configuration of an image processor based on the conventional technology. In FIG. 12, each of the reference numerals $120_{11}, 120_{12}, \ldots, 120_{mn}$ (m and n: arbitrary integers) indicates a structure of a unit pixel referred to as a charge modulation device (CMD), the CMDs are arranged in a matrix, a video voltage VDD is commonly applied to each drain thereof, row lines $122_1, 122_2, \ldots, 122_m$, are connected to gates, and column lines $124_1, 124_2, \ldots, 124_n$ are connected to sources respectively.

The column lines $124_1, 124_2, \ldots, 124_n$ are connected to a video line (output line for outputting image signal) 130 as well as to a line 132 with a voltage V ($\geq 0$) applied thereto through transistors $126_1, 126_2, \ldots, 126_n$ for column selection (first MOS switches) as well as through transistors $128_1, 128_2, \ldots, 128_n$ for inverse selection respectively. The video line 130 is grounded through load resistance 134, and reads a signal through an output terminal 136. It should be noted that a variable source-voltage pulse train Vs is loaded onto the output terminal 136 by an illustrated external on-chip circuit or some other external circuit.

Further, the row lines $122_1, 122_2, \ldots, 122_m$ are connected to the vertical scanning circuit 138, and vertical scan signals φG1, φG2, . . . , φGm are applied thereonto respectively, while the gates of the column-selection transistors $126_1, 126_2, \ldots, 126_n$ as well as of the inverse selection transistors $128_1, 128_2, \ldots, 128_n$ are connected to the horizontal scanning circuit 140, and horizontal scan signals φS1, φS2, . . . , φSn as well as the inverse signals thereof are applied to the gates respectively. It is assumed that the CMDs are formed on the same substrate and a substrate voltage Vsub (not shown) is applied to the substrate.

In the conventional type of image processor configured as described above, for example, by concurrently setting the signals φG1, φG2, . . . , φGm to an ON state with the vertical scanning circuit 138, all the pixels from the first row to the m-th row each connected to column are selected, and a sum of signal currents is read out. Then, a one-dimensional projection of a light pattern irradiated onto each of the two-dimensional CMDs can be obtained through scanning (by controlling the signals φS1, φS2, . . . , φSn) by the horizontal scanning circuit 140.

As described above, in the conventional type of image processor, the ordinary processing for outputting a two-dimensional image projected onto an image sensor is executable and also the processing for outputting projection data for the two-dimensional image is executable.

However, in the conventional type of image processor, computing is performed by adding (summing) currents of all the pixels constituting each line, and so, the output level when a gradation signal (pixel value) is read out from one pixel is largely different from that when a result of the computing for projection is read out, namely an electric current value for the result of the computing for projection becomes extremely large.

As described above, the fact that an electric current in computing for projection becomes extremely large and so requires a large amount of power.

In addition, in order to suppress the difference between the output level when a gradation signal (pixel value) is read out from a pixel and that when a result of the computing for projection is read out, types of power units (such as a low-potential power unit) are required to be increased.

In addition, output is easily a nonlinear 'amount of light'×'number of pixels' due to saturation of the added currents, there-fore, in order to maintain the linearity, number of pixels capable of being added disadvantageously becomes extremely small.

SUMMARY OF THE INVENTION

It is an object of the present invention to obtain, for the purpose of solving the problems as described above, an image processor in which an output level and a level of power consumption are equalized to each other between ordinary processing for outputting a two-dimensional image projected onto an image sensor and processing for outputting a result of the computing for the two-dimensional image.

With the present invention, a result of computing for projection is an average of pixel values in the unit pixel circuits constituting each row and column, so that, as is in the conventional type, an output level when a gradation signal (pixel value) is read out from a pixel is not largely different from that when a result of computing for projection is read out, and an electric current value in the result of computing for projection does not become extremely large. As a result, power consumption can largely be reduced as compared to that of the conventional type.

With the present invention, for example, when a result of computing for projection in a row direction forming an array is read out, electric charge is accumulated in an optoelectronic transducer due to the incident light, and an output potential generated due to the electric charge is changed. The potential amplified by a buffer circuit is stored in a memory for a unit pixel circuit according to the output potential. Then, all the corresponding pixel values are read out to an output line under the control of a switching circuit corresponding to the row direction. It should be noted that, in the processing for reading out a result of computing for projection, namely in the processing of compressing a two-dimensional image, i.e., the computing for projection, this pixel-value read-out processing is performed in all the unit pixel circuits at the same time, and at this point of time, the charge is re-distributed on the output line, so that a result of the computing for projection as an average of pixel values in unit pixel circuits can be obtained.

With this operation, it is not required to suppress the difference between the output level when a gradation signal (pixel value) is read out from each unit pixel circuit and that when a result of the computing for projection is read out, there fore, the types of power units (such as a low-potential power unit) need not be increased. In addition, access is made to all the unit pixel circuits at the same time to average the potentials, which allows the linearity of 'amount of light'×'number of pixels' to be improved.

With the present invention, an offset of an optoelectronic transducer and a memory for a unit pixel circuit is accurately carried out, so that reliability of pixel values is enhanced.

With the present invention, by controlling an image-data read circuit, a pixel value of each unit pixel circuit stored in the memory capacitor for a read circuit and a result of computing for projection of each row and each column can be read out any time until new data is stored therein. Both of the output levels are equivalent to each other, so that the types of power units are not required to be increased.

With the present invention, an offset of a memory for a read circuit is accurately carried out, and further the memory capacitor for a read circuit can be insulated from an output line, so that reliability of image data to be read out is enhanced.

With the present invention, a difference between a specified reference value and image data for a current frame can be obtained, so that the offset in output of pixels can be removed by using two memory capacities for a read circuit, and as a result, variations among pixels can be suppressed. In addition, a difference between image data for a previous frame and that for a current frame can be obtained, so that a result of computing for projection can also be subjected to time differentiation.

In accordance with the present invention, an average of pixel values (image data) in all the unit pixel circuits can be outputted through the same processing as computing for projection. Therefore, the amount of computations required, for example, when an optimal output gain is adjusted from the average value of an amount of light incident upon an image-pickup surface and when an accumulation time is optimized is largely reduced by a circuit provided in the later stage, namely by DSP or the like.

In accordance with the present invention, a difference between a specified reference value and a result of computing the average value of all the pixels in a current frame can be obtained, so that the offset in a result of computing the average value of all the pixels can be removed by using two memory capacities for a read circuit. In addition, a difference between a result of computing the average value of all the pixels in a previous frame and that in a current frame can be obtained, so that a result of computing the average value can also be subjected to time differentiation.

In accordance with the present invention, it is possible to output, for example, by assigning a weight of 2 to certain image data and a weight of −1 to the adjacent two pixels, a difference therebetween. Therefore, an equivalent result to one-dimensional filtering processing can be obtained, so that the data in a state where filtering is performed can be outputted.

In accordance with the present invention, in the processing of computing for projection, signal charge (potential) is re-distributed on an output line, so that even a case of 100×100 pixels, substantially only a time spent for 100×2 pixels is required (because computation for projection for 100×100 rows can be performed at a time, and then computation for projection for 100×100 columns can be performed at a time), therefore, a read-out time required for the processing of computing for projection can be speeded up.

In accordance with the present invention, in the processing of reading out a pixel value for each pixel, buffered pixel values are read out directly to an output line without execution of processing for storing the value in the memory capacitor for a unit pixel circuit, so that a time required for the processing of reading out a two-dimensional image can be speeded up.

In accordance with the present invention, the obtained result of computing for projection is an average of the signal charges stored in the memory capacitor constituting each row and each column, so that, as is in the conventional type, an output level when a gradation signal (pixel value) is read out from a pixel is not largely different from that when a result of computing for projection is read out, and a current value in the result of computing for projection does not become extremely large. As a result, power consumption can largely be reduced as compared to that of the conventional type.

Other objects and features of this invention will become apparent from the following description with reference to the accompanying drawings.

DESCRIPTION OF THE PREFERRED EMBODIMENTS

Detailed description is made hereinafter of preferred embodiments of the image processor according to the present invention with reference to the related drawings. It should be noted that the present invention is not limited to the described embodiments.

Figure 1:
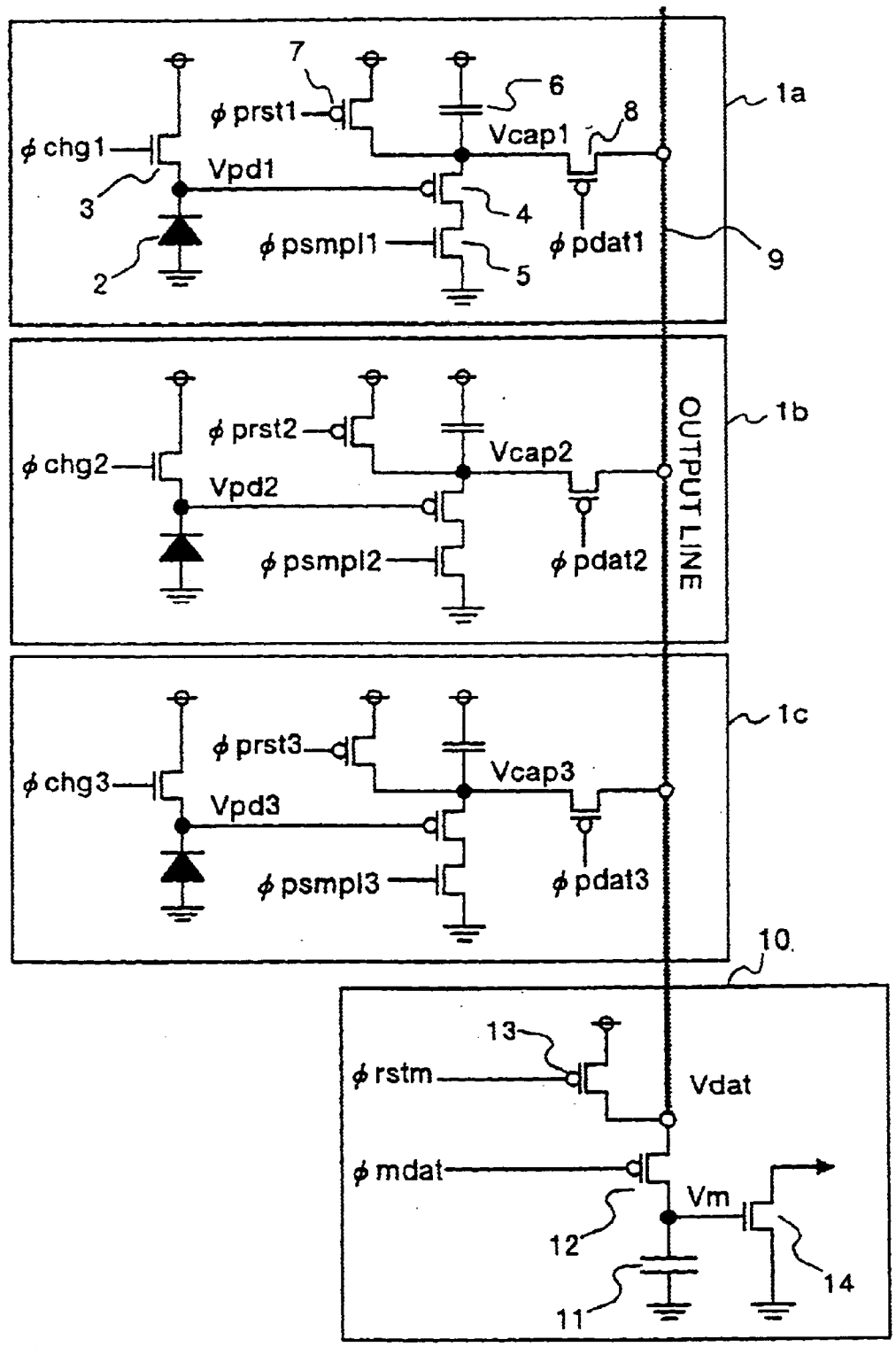
FIG. 1 is a view showing configuration of Embodiment 1 of the image processor according to the present invention.

FIG. 1 is a configuration of Embodiment 1 of the image processor according to the present invention. In FIG. 1, the image processor of the present comprises a plurality of unit pixel circuits (1a, 1b, 1c) arranged in an array, each unit pixel circuit for outputting a pixel value, according to the amount of incident light, to an output line 9 respectively, the processor includes a plurality of unit components 10 each for a horizontal line memory, provided in each row and each column in the plurality of unit pixel circuits, each of which can read out a pixel value of each unit pixel circuit and a result of computing for projection for each row and each column, and the unit pixel circuits constituting each row and column the corresponding unit components for a horizontal line memory are connected to discrete output lines. It should be noted that, in this embodiment, description is made for the operation of image processing with reference to a particular column (the unit pixel circuits 1a, 1b, 1c, and unit component 10 for horizontal line memory) among a plurality of unit pixel circuits arranged in an array (m×n: m and n are arbitrary integers). Accordingly, the same operation is performed in the rows as well as in the other columns not shown in the figure.

Designated at the reference numeral 2, in the unit pixel circuit 1a, is a photodiode (PD) for accumulating the electric charge of each pixel due to the incident light and changing the output potential according to the amount of the light, at 3 is a PD-resetting MOS transistor for resetting the photodiode 2, at 4 a buffering MOS transistor for buffering signal charge of the photodiode 2, at 5 a switching MOS transistor for executing sampling of a pixel value, at 6 a memory capacitor inside a pixel for storing a potential generated by the signal charge buffered by the buffering MOS transistor 4 as a pixel value, at 7 a memory-resetting MOS transistor for resetting the memory capacitor 6 inside a pixel, and at 8 a switching MOS transistor for connecting the memory capacitor 6 inside a pixel to the output line 9.

It should be noted that, in this embodiment, as the particular column is referred to as described above, only one unit of the switching MOS transistor 8 is provided, but in the actual case, a switching MOS transistor corresponding to an output line of a row is provided connected in parallel to the switching MOS transistor 8 (Refer to a unit pixel circuit 16 in FIG. 4 described later). The unit pixel circuits 1b and 1c have the same configuration, so that the same reference numerals are assigned to the sections corresponding to those in the circuit and description thereof is omitted herein.

In the unit component 10 for a horizontal line memory, designated at the reference numeral 11 is a memory capacitor for storing therein pixel values of the unit pixel circuits 1a, 1b, 1c and a result of computing for projection for the row shown in the figure, at 12 a switching MOS transistor for connecting the memory capacitor 11 to the output line 9, at 13 an output-line resetting MOS transistor for resetting the output line 9, and at 14 an amplifying MOS transistor for reading out a signal value of the memory capacitor 11.

The image processor configured as described above has a function of selectively executing, for example, the processing for outputting a two-dimensional image projected onto an image sensor (processing of successively reading out each pixel value for one pixel) and the processing for compressing the two-dimensional image by computing for projection (processing of computing for projection).

Figure 2:
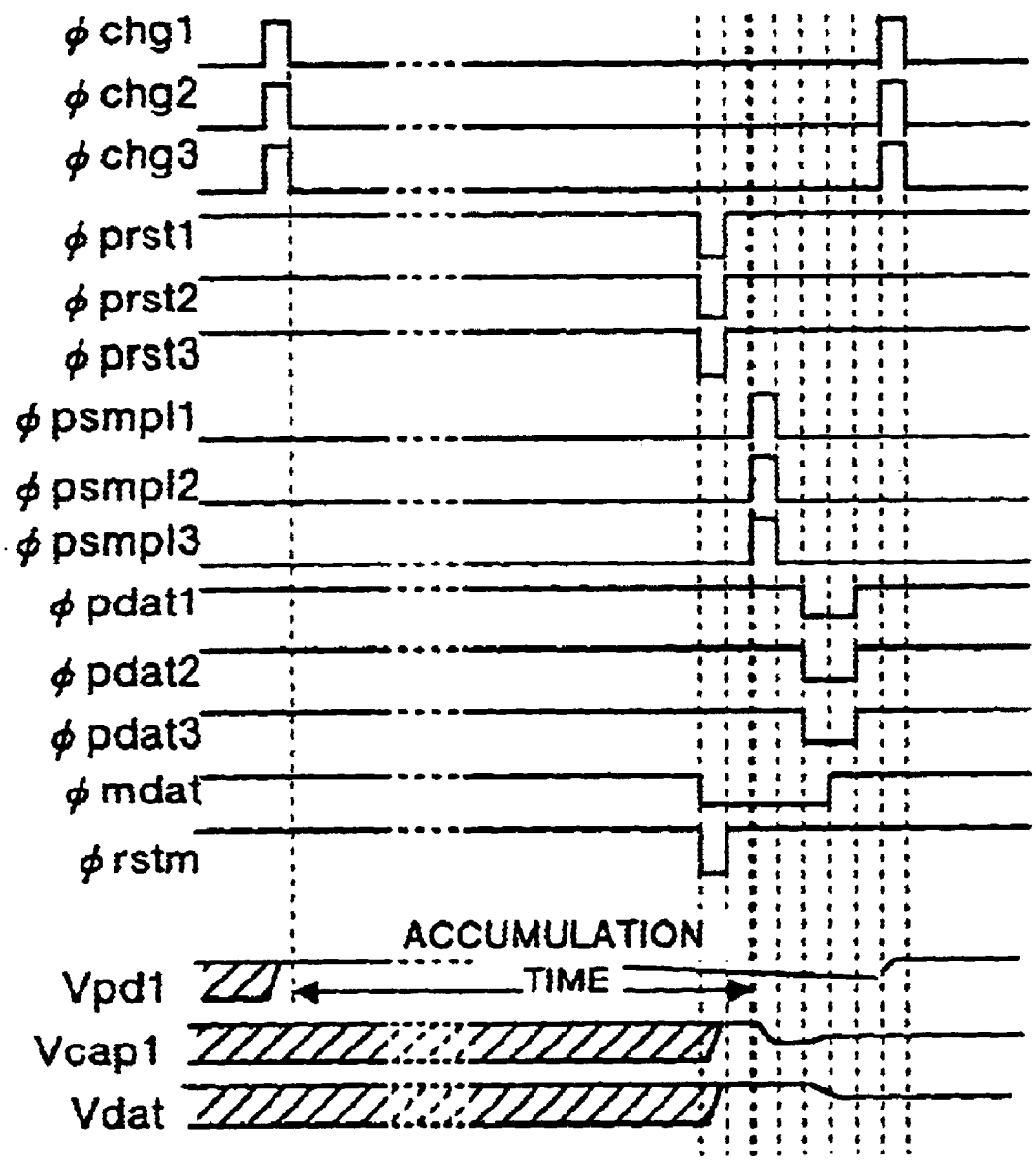
FIG. 2 is a timing chart showing the processing of computing for projection.

Next, description is made for the processing of computing for projection and the processing of successively reading out each pixel value for one pixel with reference to FIG. 1. FIG. 2 shows a timing chart during the processing of computing for projection in the circuit according to this embodiment shown in FIG. 1. For the processing of computing for projection, all driving pulses (signals chg, prst, psmpl, and pdat in the figure) are concurrently supplied to all the unit pixel circuits (1a, 1b, and 1c). At first, the photodiodes 2 are reset by pulses φchg 1, 2, 3. When the electric charge is accumulated in the photodiodes 2 inside the unit pixel circuit due to the incident light in this state, voltages Vpd 1, 2, 3 on the gates of the buffering MOS transistors 4 vary according to the amount of the light.

Herein, the memory capacitor 6 inside a pixel is reset to the source potential by supplying pulses φprst 1, 2, 3 to the memory-resetting MOS transistors 7, and when pulses φpsmpl 1, 2, 3 are supplied to the switching MOS transistors 5, signal values Vcap 1, 2, 3 according to each potential of the photodiodes 2 are accumulated in the memory capacitor 6 inside of each pixel.

When pulses φpdat 1, 2, 3 are supplied to the switching MOS transistors 8 in this state, the memory capacitore 6 inside the pixels in the unit pixel circuits are connected to each other through the output line 9. At this point of time, an average value Vdat of potentials due to re-distribution of the electric charge can be obtained on the output line 9, and this value is a result of computing for projection.

Herein, if a pulse φmdat is supplied to the switching MOS transistor 12 and memory capacitor 11 is connected to the output line 9, this result Vdat of the computing for projection is read out as a memory potential Vm. It should be noted that resetting of the output line 9 is performed, in the state where the memory capacitor 11 is connected to the output line 9, by supplying a pulse φrstm to the output-line resetting MOS transistor 13, and this processing is performed before the pulses φpdat 1, 2, 3 are supplied to the switching MOS transistors 8.

Figure 3:
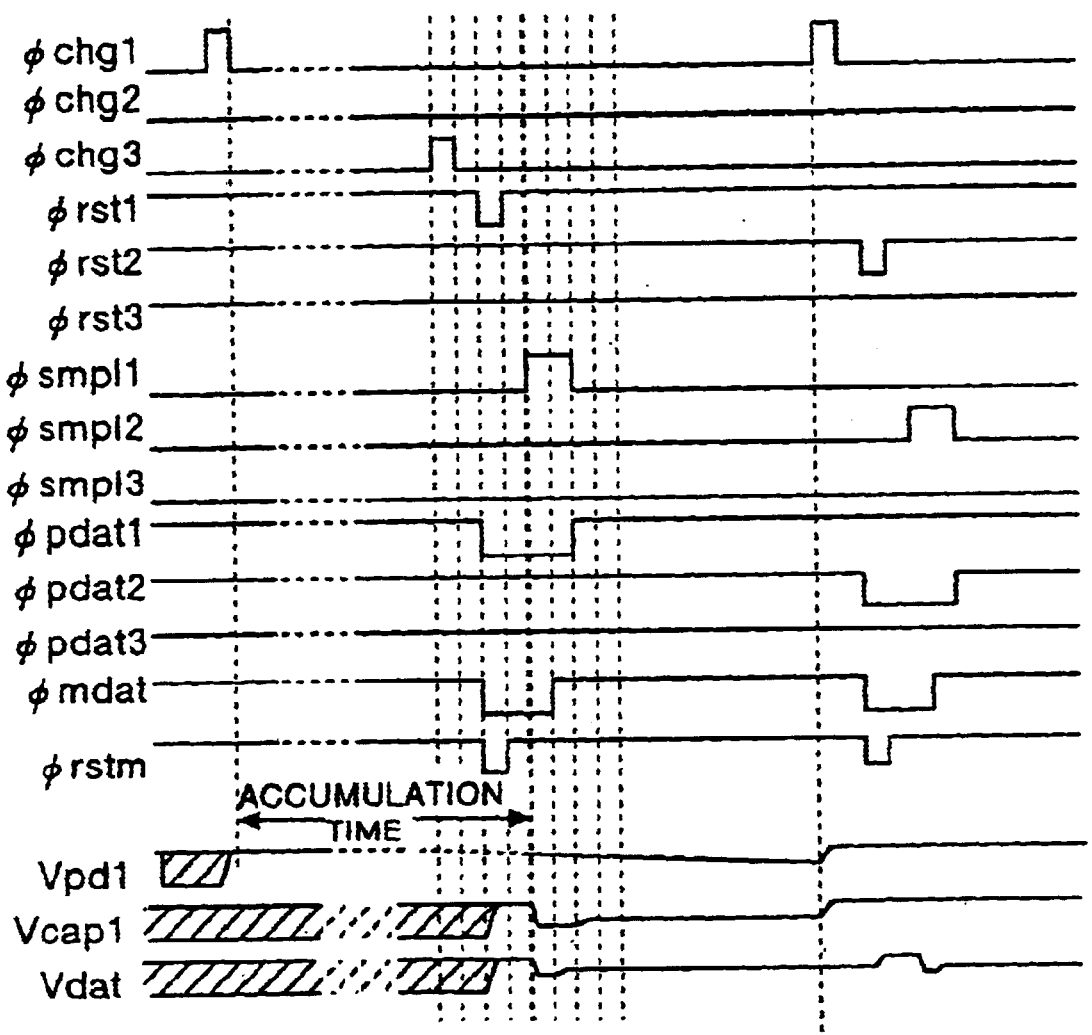
FIG. 3 is a timing chart showing the processing of outputting a two-dimensional image.

FIG. 3 shows a timing chart of the processing for successively reading out each pixel value for one of the pixels in the circuit according to the embodiment shown in FIG. 1. The processing for successively reading out each pixel value for one of the pixels, namely the usual processing for reading out images is realized by successively supplying driving pulses to each row. Although the following description assumes the unit pixel circuit 1a in the first row as an example, the same processing is successively executed to the unit pixel circuits 1b and 1c.

At first, the photodiode 2 is reset by supplying the pulse φchg 1 to the PD-resetting MOS transistor 3. When electric charge is accumulated in the photodiode 2 due to the incident light, a voltage Vpd 1 on the gate of the buffering MOS transistor 4 varies according to an amount of the light.

Herein, the memory capacitor 6 inside the pixel and the memory capacitor 11 are connected to the output line 9 by supplying the pulses φpdat1 and φmdat1 to the switching MOS transistors 8 and 12, respectively. By supplying the pulses φprst 1 and φrstm to the memory-resetting MOS transistor 7 and output-line resetting MOS transistor 13 in this state, each of the memory capacitor 6 inside the pixel, the output line 9, and the memory capacitor 11 are reset to the source potential. Then, when the pulse φpsmpl 1 is supplied to the switching MOS transistor 5, a signal value Vm according to the potential of the photodiode 2 is directly accumulated in the memory capacitor 11.

In this embodiment as described above, in the processing of reading out a result of computing for projection, memory potentials in the unit pixel circuits are averaged by re-distributing the electric charge, while in the processing of reading out a pixel value for each pixel, a signal value is read out directly to an output line by the buffer inside the unit pixel circuit, so that the output levels in both of the read-out processing methods can be equalized to each other, and further it is impossible that the electric current value in the result of the computing for projection becomes extremely large. Accordingly, in this embodiment, power consumption can largely be reduced as compared to that of the conventional type.

In this embodiment, it is not required to suppress the difference between the output level when each pixel value is read out from each unit pixel circuit and that when a result of the computing for projection is read out, therefore, the types of power units (such as a low-potential power unit) need not be increased. In addition, access is made to all the unit pixel circuits at the same time to average the potentials at the time of reading out a result of computing for projection, which allows the linearity of 'amount of light'× 'number of pixels' to be improved.

It should be noted that, in the timing chart in FIG. 2, there has been shown an example of processing of computing for projection performed by using pixel values stored in all the unit pixel circuits in a column, but a result of computing for partial projection can also be obtained, for example, by getting access to a part of the unit pixel circuits constituting the column. Furthermore, as a photodiode 2, one with N-diffusion in a P-well is used herein, but, for example, one with P-diffusion in an N-well may be used. In this case, the reset state is not a source potential but a ground potential. The n-MOS transistor and p-MOS transistor may be used reversely under the condition that the circuit thereby is configured so that the same operation can be performed. It is assumed that a MOS capacitor, an interlayer polysilicone capacitor, or a pn-junction capacitor is used as the memory capacitor 6 inside a pixel.

As a mechanism of buffering the optoelectronic transducer, a AMI (Amplified MOS Imager) structure is used here, but a CMD (Charge Modulation Device), a SIT (Static Induced Transistor), an APD (Avalanche Photodiode), an FGA (Floating Gate Array), and a BASIS (Base Stored Image Sensor) or the like or some other amplification type of photoreceptor may be used as a pn photoreceptor.

Figure 4:
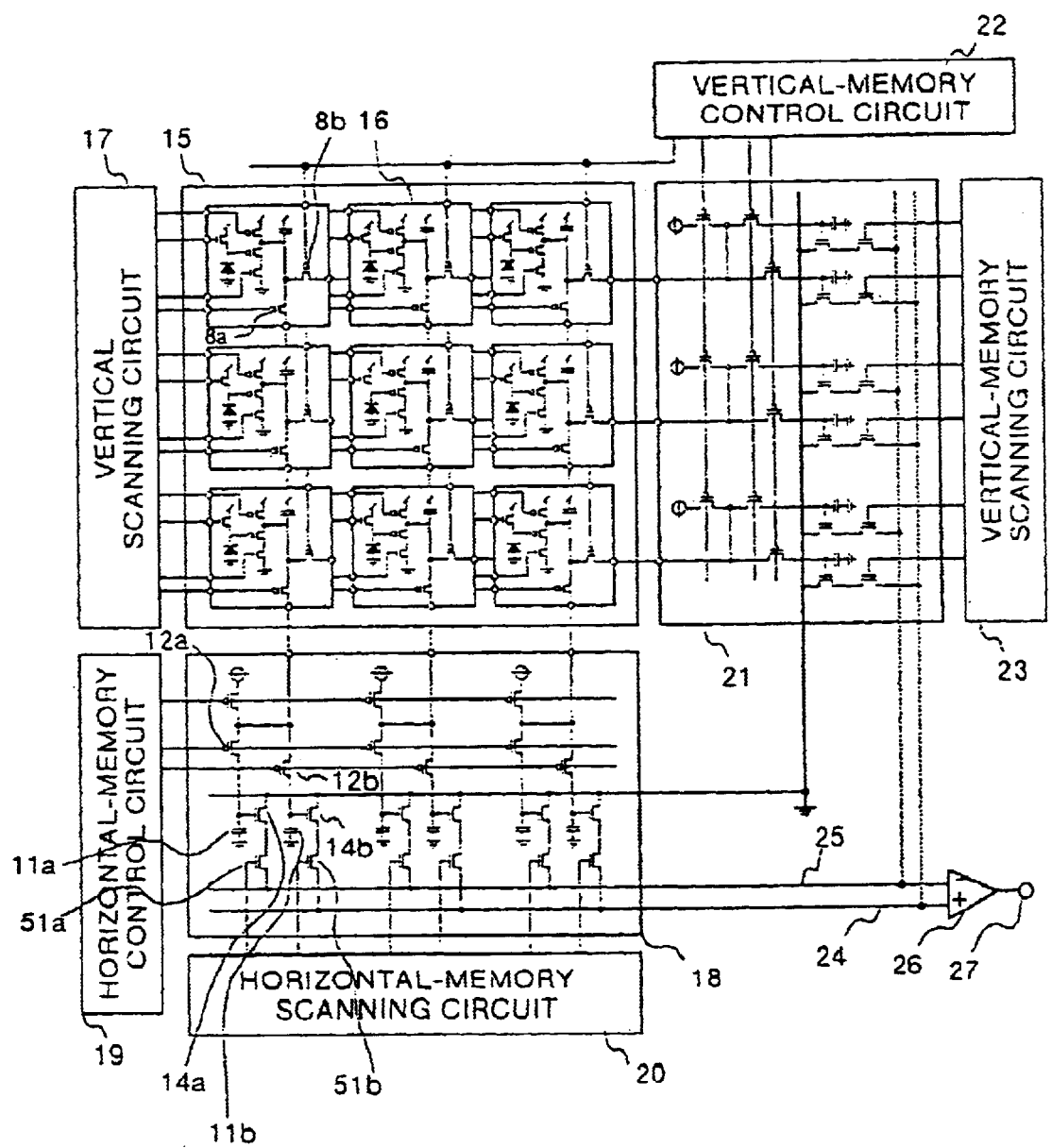
FIG. 4 is a view showing configuration of Embodiment 2 of the image processor according to the present invention.

FIG. 4 is a configuration of Embodiment 2 of the image processor according to the present invention. In FIG. 4, designated at the reference numeral 15 is a pixel array having, for example, 3-row×3-column unit pixel circuits 16 (nine units), at 17 a vertical scanning circuit for providing controls for resetting and reading the pixel array 15, at 18 a horizontal line memory for storing therein pixel values from the pixel array 15 or results of computing for projection in each column direction (a pixel value as well as a result of computing for projection is described image data hereinafter), at 19 a horizontal-memory control circuit for providing controls for inputting image data to the horizontal line memory 18, at 20 a horizontal-memory scanning circuit for providing controls for outputting image data stored in the horizontal line memory 18, at 21 a vertical line memory for storing therein results of computing for projection from the pixel array 15 in each row direction, at 22 a vertical-memory control circuit for providing controls for inputting a result of computing for projection to the vertical line memory 21, at 23 a vertical-memory scanning circuit for providing controls for outputting a result of computing for projection stored in the vertical line memory 21, at 24 a signal line through which image data from the horizontal line memory 18 or the vertical line memory 21 is outputted, at 25 a reference line through which reference data from the horizontal line memory 18 or the vertical line memory 21 is outputted, at 26 a differential amplifier for differentiating the data for the signal line 24 from that for the reference line 25, and at 27 an output terminal.

In the unit pixel circuit 16, horizontal line memory 18, and the vertical line memory 21, the same reference numerals are assigned to the sections corresponding to those in the unit pixel circuit 1 and the horizontal line memory 10, and description thereof is omitted herein. Accordingly, in this embodiment, switching MOS transistors 8a, 8b, 12a and 12b correspond to the switching MOS transistors 8 and 12 respectively; memory capacitors 11a and 11b correspond to the a memory 11; amplifying MOS transistors 14a and 14b correspond to the amplifying MOS transistor 14; and further switching MOS transistors 51a and 51b for connecting image data and reference data to the signal line 24 and the reference line 25 are added to the configuration.

In FIG. 4, each column taken up from the pixel array 15 as well as the horizontal line memory 18 corresponds to FIG. 1, and further the MOS transistors 8a and 8b are symmetrically provided with respect to the output lines in the column direction and the row direction (a size and orientation of a transistor, and a wiring capacity or the like). With this feature, computation for projection in the column direction and the row direction can be performed under the condition of the circuits equivalent to each other. Although the 3-row× 3-column pixel array 15 will be described in this embodiment for the purpose of its simple description, the number of pixels is not limited thereto, so that an arbitrary number may be used.

Next, description is made for the processing of computing for projection and successively reading out each pixel value for one pixel with reference to FIG. 4. It should be noted that description of the same processing as that in Embodiment 1 is omitted herein to make the description simpler.

In the processing of computing for projection, all the unit pixel circuits are concurrently reset by pulses from the vertical scanning circuit 17, and the read-out processing is performed after a specified period of time for accumulation has elapsed. In this read-out processing, the pulse patterns shown in FIG. 2 are applied from the vertical scanning circuit 17 and the horizontal-memory control circuit 19 to the pixel array 15 and the horizontal line memory 18 respectively, so that the computing for projection in each column direction is performed.

Then, the similar pulse patterns are applied from the vertical scanning circuit 17 and the vertical-memory control circuit 22 to the pixel array 15 and the vertical line memory 21 respectively, so that the computing for projection in each row direction is performed. Finally, results of computing for projection stored in the memory capacitor 11b inside the horizontal line memory 18 as well as in the memory capacitor 11b inside the vertical line memory 21 are successively outputted under the control by the horizontal-memory scanning circuit 20 and the vertical-memory scanning circuit 23.

It should be noted that the horizontal line memory 18 and the vertical line memory 21 each have two memory capacitors 11a and 11b for each output line respectively. For this reason, in the embodiment, a result of computing for projection in the column direction according to an image in a current frame is inputted into the memory capacitor 1ib inside the horizontal line memory 18, while a result of computing for projection immediately after all the unit pixel circuits are reset, namely offset data is inputted into the memory capacitor 11a. Then, the result of computing for projection in the current frame is outputted from the signal line 24, and the result of computing for projection immediately after the reset is outputted from the reference line 25 respectively, a difference between the two is calculated in the differential amplifier 26, and the difference is outputted to the output terminal 27. With this feature, it is possible to remove output offset of pixel values in this embodiment, with which output fluctuation among pixels can be suppressed.

In this embodiment, by making use of the structure, for example, a result of computing for projection according to an image in a previous frame is stored in the memory capacitor 11a inside the horizontal line memory 18, while a result of computing for projection according to an image in a current frame is inputted into the memory capacitor 11b. Then, the result of computing for projection in the current frame is outputted from the signal line 24, and the result of computing for projection in the previous frame is outputted from the reference line 25 respectively, a difference between the two is calculated in the differential amplifier 26, and the difference is outputted to the output terminal 27. With this feature, it is possible to output time differentiation in the result of computing for projection.

Then, in the processing of successively reading out each pixel value for one pixel, namely, in the processing of reading out a two-dimensional image, the pulse patterns shown in FIG. 3 are successively applied from the vertical scanning circuit 17 and the horizontal-memory control circuit 19 to the pixel array 15 and the horizontal line memory 18 for each row respectively.

For example, when a certain row is reset by the pulse from the vertical scanning circuit 17, read-out processing is performed after a specified period of time for accumulation has elapsed in the row. In this read-out processing, the pulse patterns shown in FIG. 3 are applied from the vertical scanning circuit 17 and the horizontal-memory control circuit 19 to the pixel array 15 and the horizontal line memory 18 respectively, pixel values thereof are stored directly in the memory capacitor 11b, and successively outputted by the horizontal-memory scanning circuit 20. When the read-out processing of the row is over, the read-out processing of pixel values corresponding to the next row is successively performed.

It should be noted that, in this embodiment, by making use of the structure having two memory capacitor as described above, the pixel values in the row are inputted into the memory capacitor 11b, while the data immediately after the row is reset is inputted into the memory capacitor 11a. Then, the pixel values are outputted from the signal line 24, and the data immediately after the reset is outputted from the reference line 25 respectively, a difference between the two is calculated in the differential amplifier 26, and the difference is outputted to the output terminal 27. With this feature, similarly to the case of the computing for projection, it is possible to remove output offset of pixel values, with which output fluctuation among pixels can be suppressed.

Figure 5:
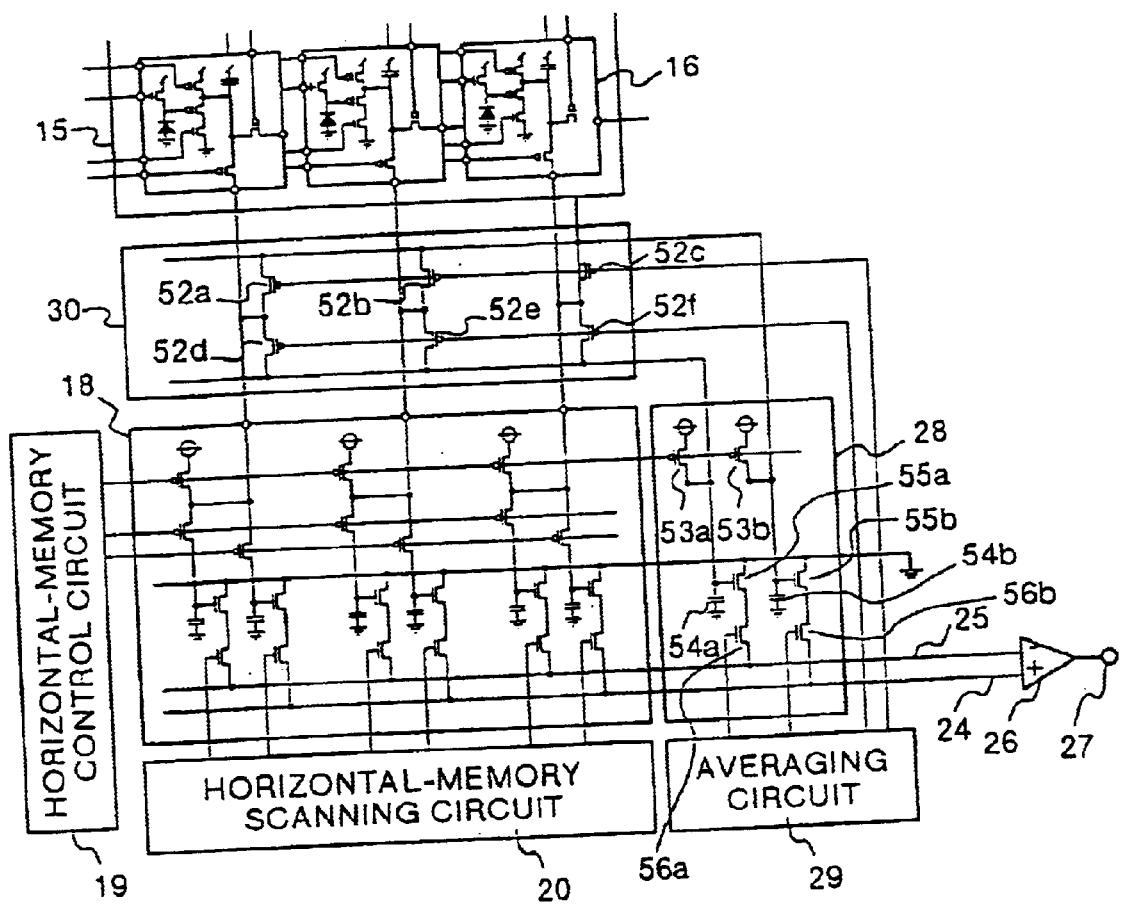
FIG. 5 is a view showing configuration of Embodiment 3 of the image processor according to the present invention.

FIG. 5 is the configuration of Embodiment 3 of the image processor according to the present invention. It should be noted that the same reference numerals are assigned to the sections corresponding to those in Embodiment 1 and Embodiment 2 as described above, and description thereof is omitted herein. Description of the same processing as those in Embodiment 1 and Embodiment 2 is also omitted herein.

Designated at the reference numeral 28, in FIG. 5, is an all-pixel average memory for storing therein an average value of pixel values in all the unit pixel circuits, namely a result of computing an average value of all the unit pixel circuits; at 29 an all-pixel averaging control circuit for averaging all the pixels; at 30 an all-pixel averaging switching array for connecting output lines to the all-pixel averaging control circuit for averaging all the pixels. Designated at the reference numerals 53a, 53b, 56a and 56b, in the all-pixel average memory 28, are switching MOS transistors respectively, at 54a and 55b are memory capacitors, at 55a and 55b are amplifying MOS transistors respectively. The reference numerals at 52a to 52f in the all-pixel averaging switching array 30 each indicate a switching MOS transistor respectively.

Next, description is made for the processing of computing for projection in all the unit pixel circuits with reference to FIG. 5. It should be noted that description of the same processing as those in Embodiment 1 and Embodiment 2 is omitted herein to make the description simpler. In the processing of computing for projection in all the unit pixel circuits, at first, all the unit pixel circuits are concurrently reset by pulses from the vertical scanning circuit 17, and the read-out processing is performed after a specified period of time for accumulation has elapsed. In this read-out processing, the pulse patterns shown in FIG. 2 are provided from the vertical scanning circuit 17 and the horizontal-memory control circuit 19 to the pixel array 15 and the horizontal line memory 18 respectively, so that the computing for projection in each column direction (the row direction may be replaceable although not shown in the figure) is performed.

At this point of time, when the pulse φmdat shown in FIG. 2 is supplied, not to the horizontal line memory 18, but to the switching MOS transistors 52a, 52b, and 52c inside the all-pixel averaging switching array 30 (supplied by the all-pixel averaging control circuit 29), an average of all the pixels, namely a result of computing an average value due to re-distribution of charge as described above is stored in the memory capacitor 54b inside the all-pixel averaging memory 28. Then, the result of computing an average value of the all unit pixel circuits stored in the memory capacitor 54b is outputted from the output terminal 27 under the control by the all-pixel averaging control circuit 29.

It should be noted that the all-pixel averaging memory 28 has two memory capacitors 11a and 11b for each output line respectively. Therefore, in this embodiment, by making use of the above feature, for example, a result of computing an average value of all the pixels according to an image in a current frame is inputted in the memory capacitor 54b, while a result of computing an average value immediately after all the unit pixel circuits are reset, namely offset data is inputted into the memory capacitor 54a. Then, the result of computing an average value in the current frame is outputted from the signal line 24, and the result of computing an average value immediately after the reset is outputted from the reference line 25 respectively, a difference between the two is calculated in the differential amplifier 26, and the difference is outputted to the output terminal 27. With this feature, it is possible to remove output offset of pixel values in the embodiment.

In this embodiment, by making use of the structure, for example, a result of computing an average value of all the pixels according to an image in a previous frame is stored in the a memory 54a, while a result of computing an average value of all the pixels according to an image in a current frame is inputted into the memory capacitor 54b. Then, the result of computing an average value in the current frame is outputted from the signal line 24, and the result of computing an average value in the previous frame is outputted from the reference line 25 respectively, a difference between the two is calculated in the differential amplifier 26, and the difference is outputted to the output terminal 27. With this feature, it is possible to output time differentiation in the result of computing an average value of all the pixels.

Although pulses applied to the all-pixel averaging switching array 30 are concurrently supplied to all the columns in FIG. 5, if a pulse is supplied only to a column, namely if a pulse is supplied discretely to each of the switching MOS transistor 52a to 52f, an average value, namely a result of computing an average value for a part of two-dimensional image can be obtained.

In this embodiment, a result of computing an average value of all the pixels can be used as reference data when an optimal output gain is set from an average value of an amount of light incident upon an image-pickup surface and when an accumulation time is optimized. In this case, the computing to generally be performed by DSP or the like in the processing circuit provided in a later stage can be executed by the circuit in FIG. 5, so that a load on the processing circuit in the later stage is largely reduced.

Figure 6:
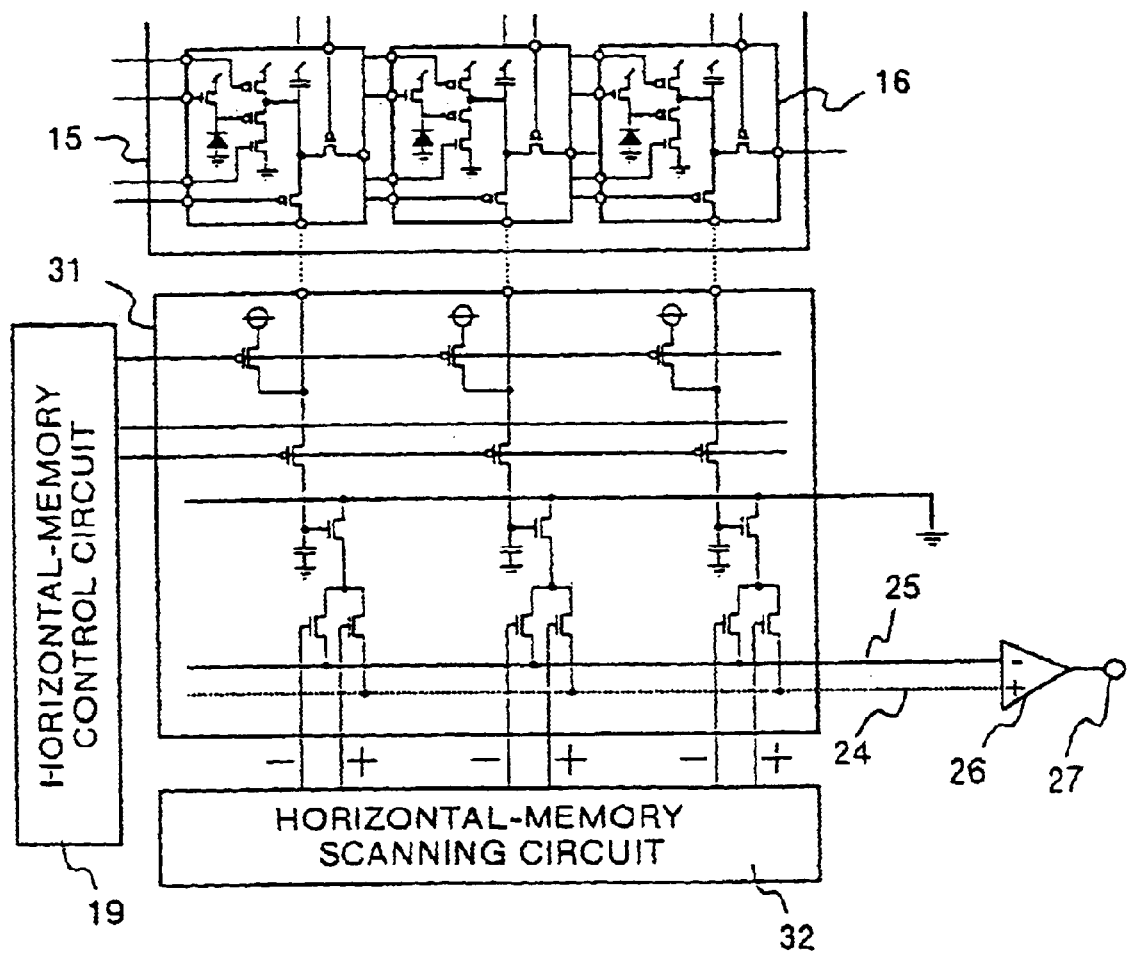
FIG. 6 is a view showing configuration of Embodiment 4 of the image processor according to the present invention.

FIG. 6 is the configuration of Embodiment 4 of the image processor according to the present invention. It should be noted that the same reference numerals are assigned to the sections corresponding to those in Embodiment 1, Embodiment 2, and Embodiment 3 as described above, and description thereof is omitted herein. Description of the same processing as those in Embodiment 1, Embodiment 2, and Embodiment 3 is also omitted herein.

In FIG. 6, designated at the reference numeral 31 is a line memory array for a space-differentiating function for storing therein pixel values from the pixel array 15 or results of computing for projection in each column direction, and at 32 a horizontal memory scanning circuit for a space-differentiating function of providing controls for outputting image data stored in the line memory array for a space-differentiating function.

In this embodiment, the line memory array for a space-differentiating function 31 can selectively output positively and negatively weighted data from the memory capacitor 11 in each column to the output lines 24, 25. For example, in the horizontal memory scanning circuit 32, access is made so that data is outputted from the memory capacitor 11 in a second column to a positive (+) output line 24, and data is outputted from the memory capacitor 11 in a first column and third column to a negative (−) output line 25, and control is provided so that the input into the positive terminal of the differential amplifier 26 is a gain twice as much as that of the input into the negative terminal thereof.

With this feature, in this embodiment, the data weighted with (−1, +2, −1) can be outputted from the memory capacitor 11 in each column. This indicates to be equivalent to that when one-dimensional filtering is performed thereto. Herein, although the horizontal line memory 31 has the memory capacitor 11 inside thereof, for example, by having two memory capacitors 11 therein, a difference from a reset level and a difference from data in the previous frame can be outputted like in Embodiment 2.

Figure 7:
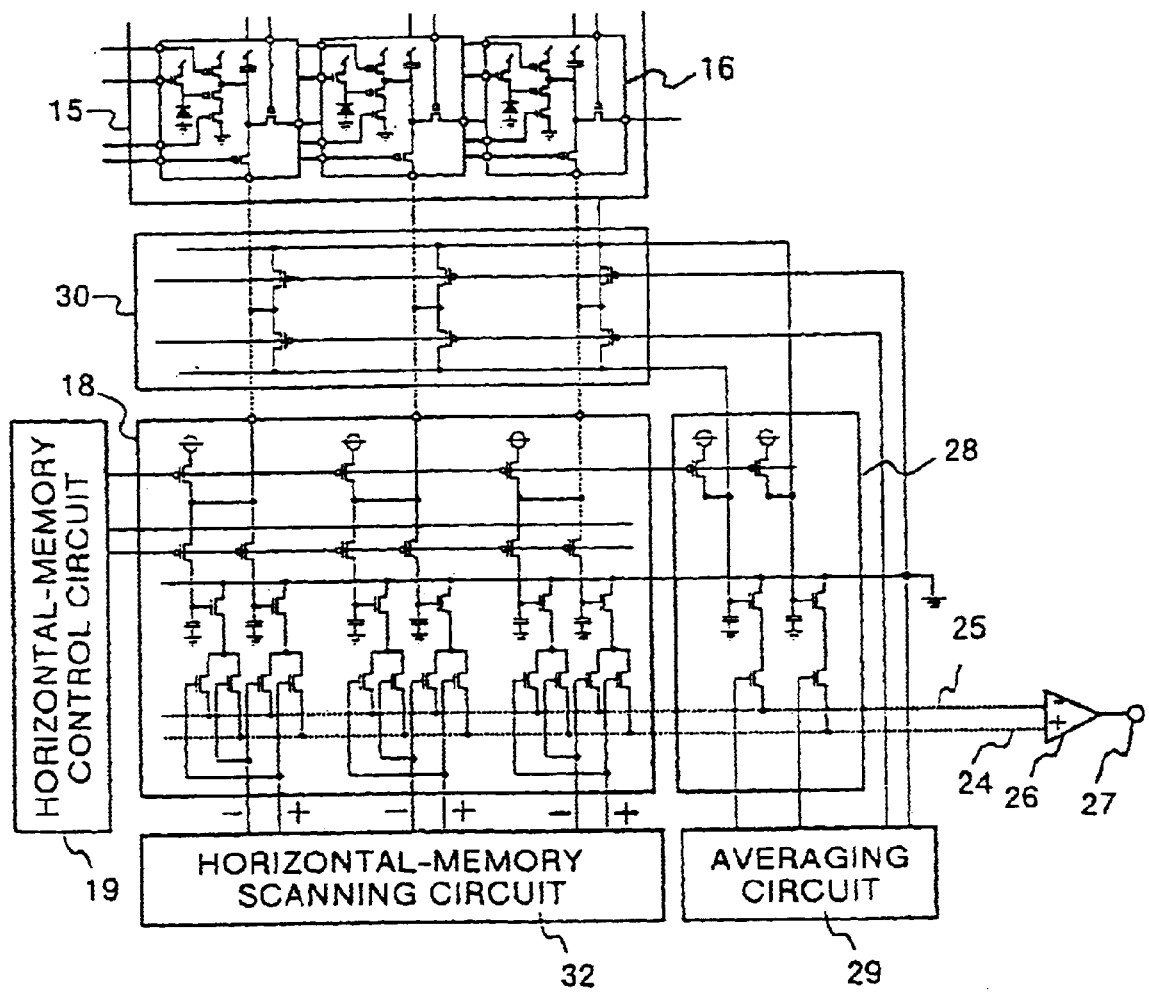
FIG. 7 is a view showing configuration of Embodiment 5 of the image processor according to the present invention.

FIG. 7 is the configuration of Embodiment 5 of the image processor according to the present invention. This embodiment is characterized in that it includes all the functions in Embodiment 1, Embodiment 2, Embodiment 3, and Embodiment 4. It should be noted that the same effect can be obtained in this embodiment by performing the same processing as that in those embodiments, so that description of each processing is omitted herein.

Figure 8:
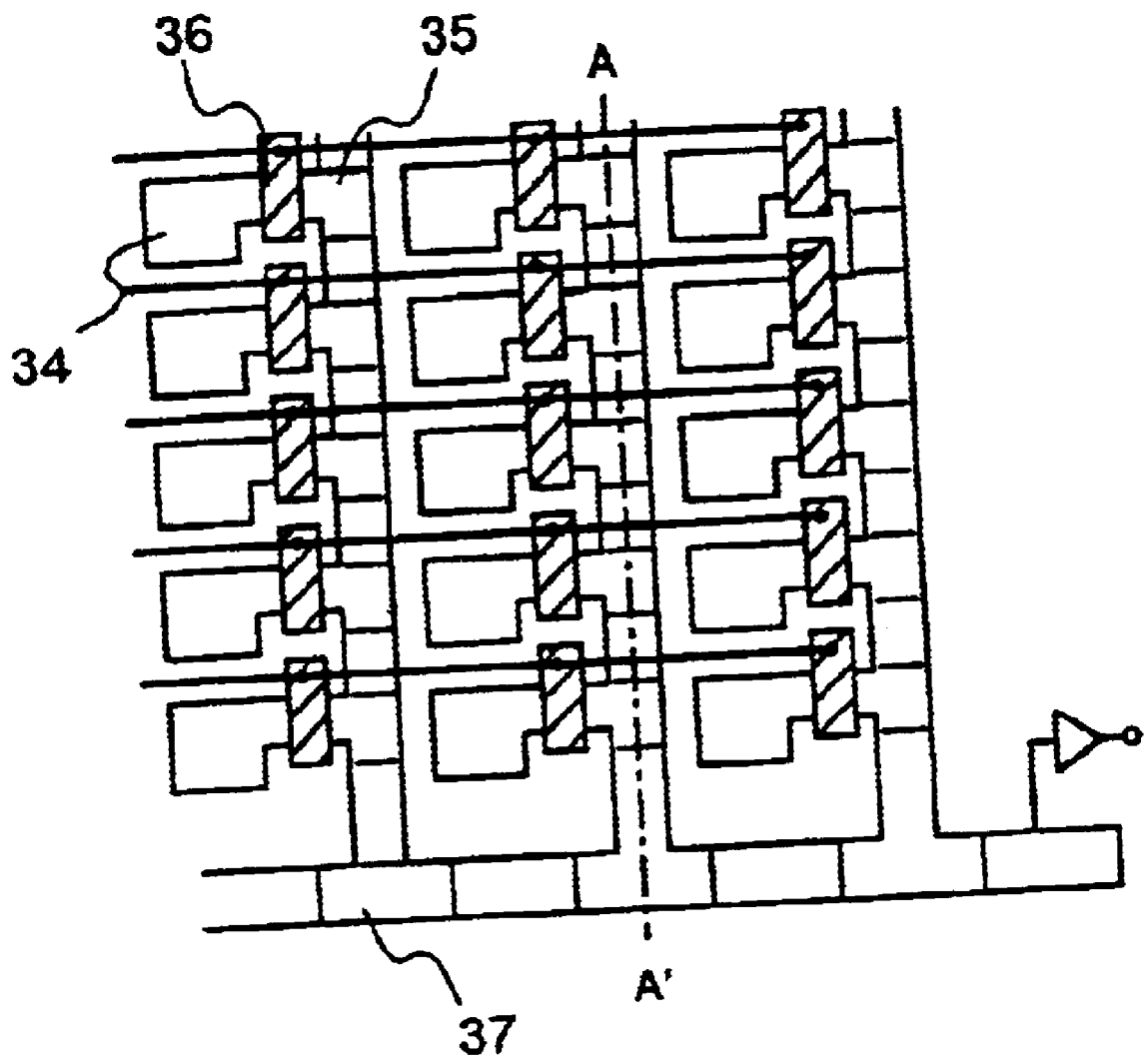
FIG. 8 is a view showing configuration of Embodiment 6 of the image processor according to the present invention.

FIG. 8 is the configuration of Embodiment 6 of the image processor according to the present invention, and FIGS. 9A to 9D are views showing an operation in Embodiment 6. In Embodiment 1 to Embodiment 5 as described above, as a method of computing for projection, there has been shown the method of averaging potentials in the memory capacitor 6 inside the pixel on the output line 9 of a metal wiring through each switching MOS transistor 8, but herein projection is computed by using transfer gates in place of the switching MOS transistors 8 and further using transfer paths as output lines with CCDs (Charge Coupled Device) or CSDs (Charge Sweep Device).

Figure 9:
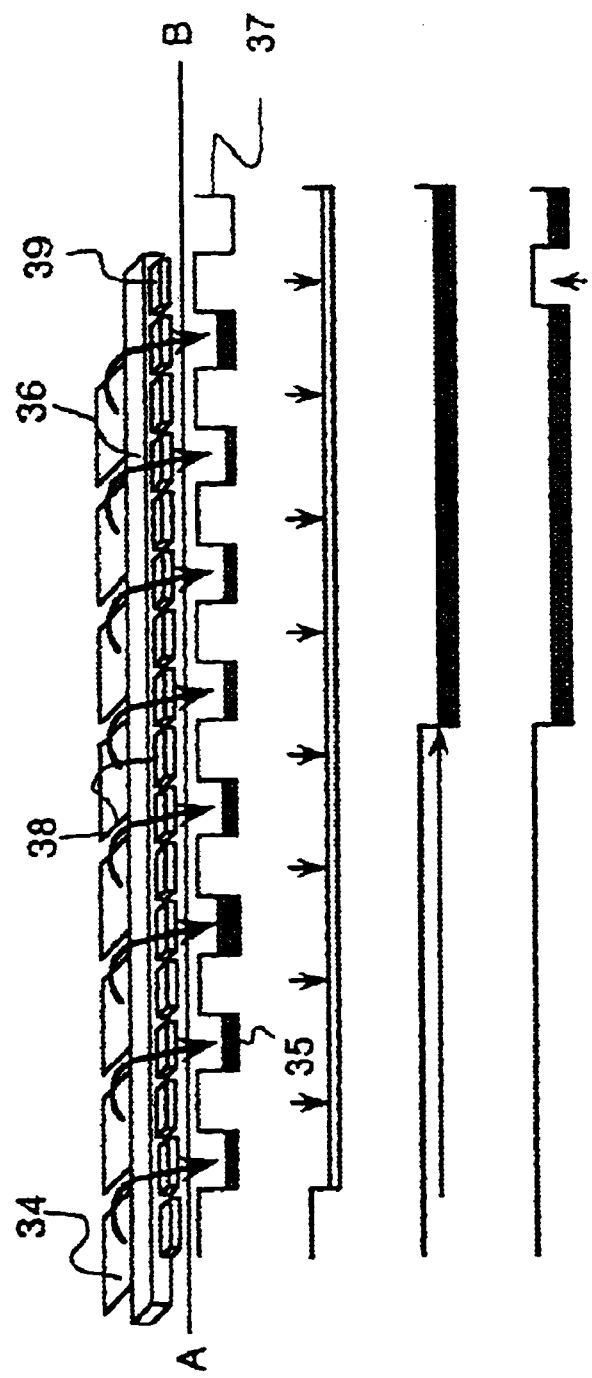
FIGS. 9A to 9D are views showing the operation in Embodiment 6.
Figure 10:
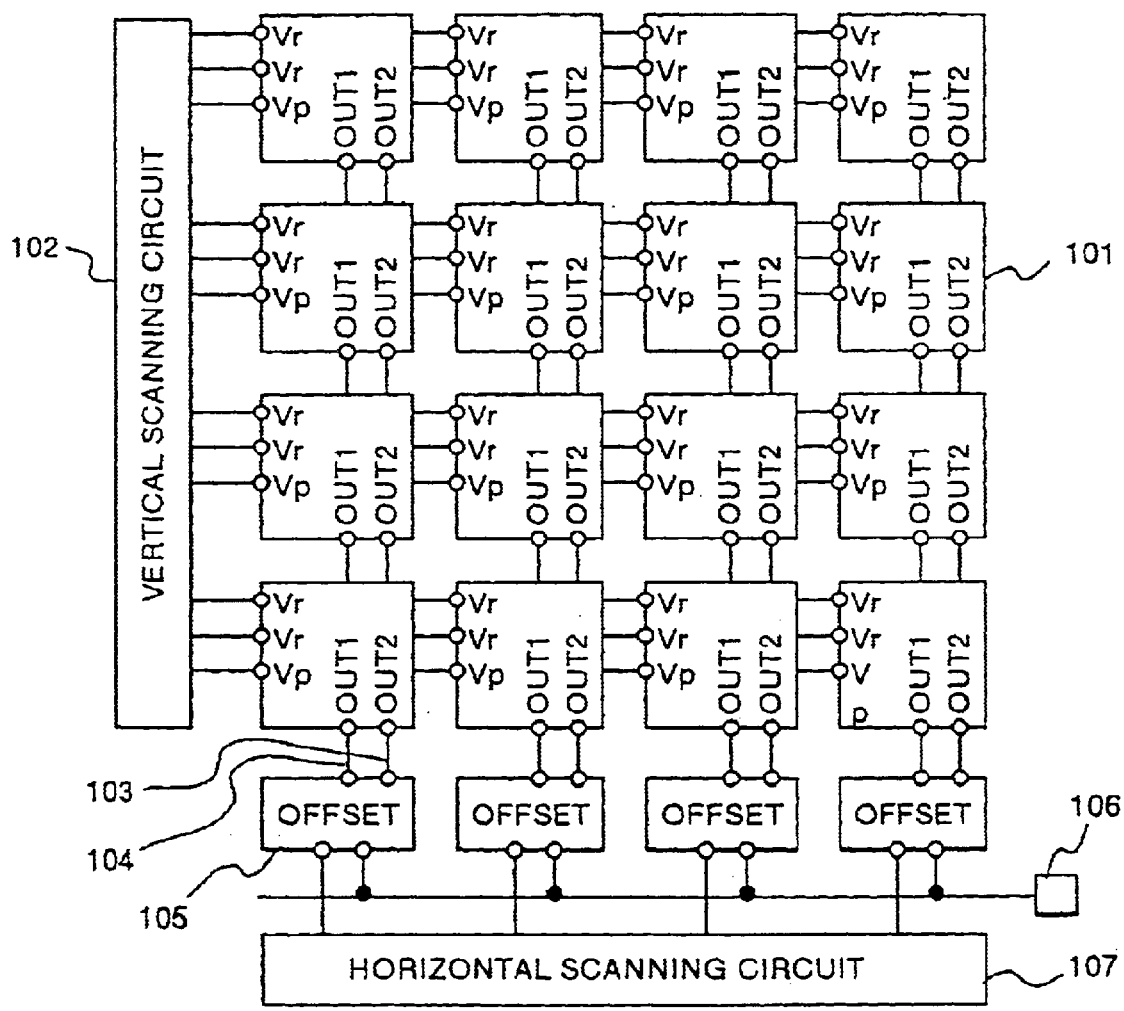
FIG. 10 is a view showing configuration of the image processor based on the conventional technology.
Figure 11:
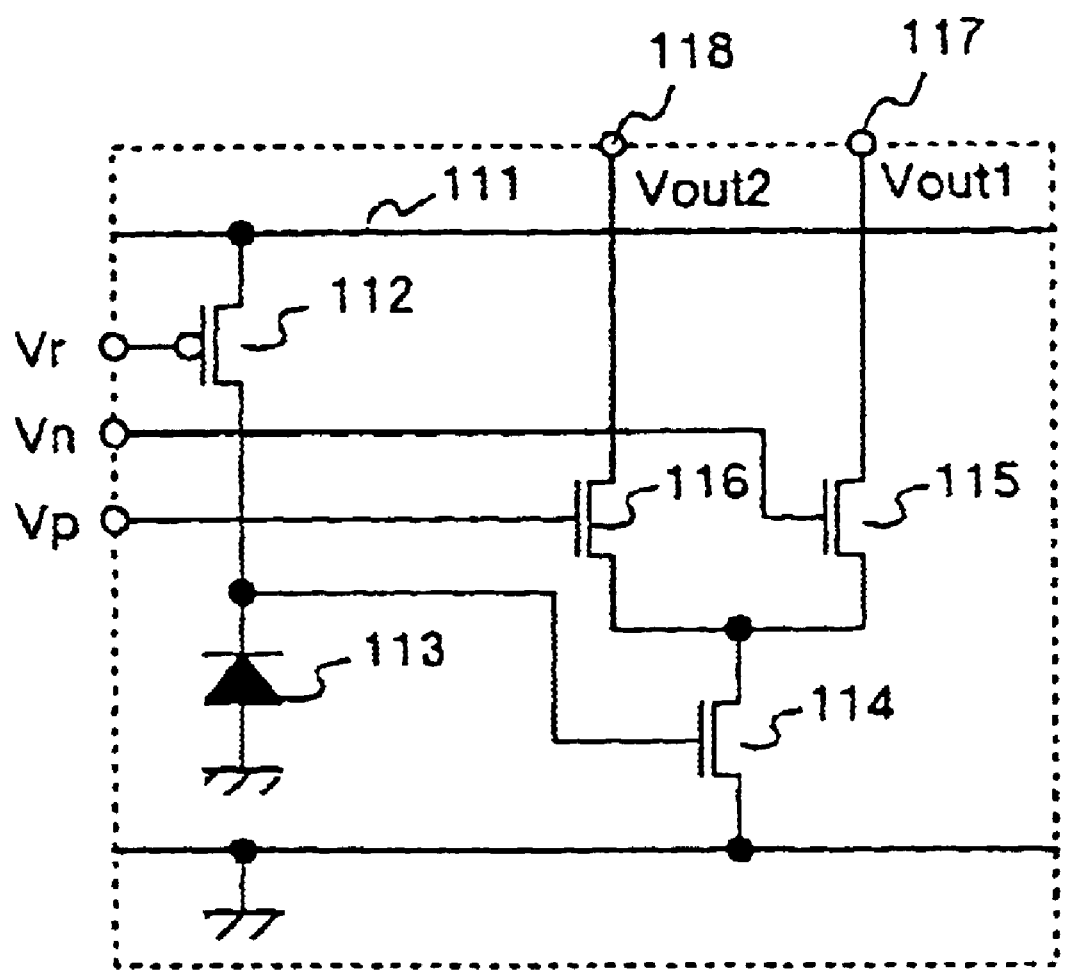
FIG. 11 is a view showing the unit pixel circuit based on the conventional technology.
Figure 12:
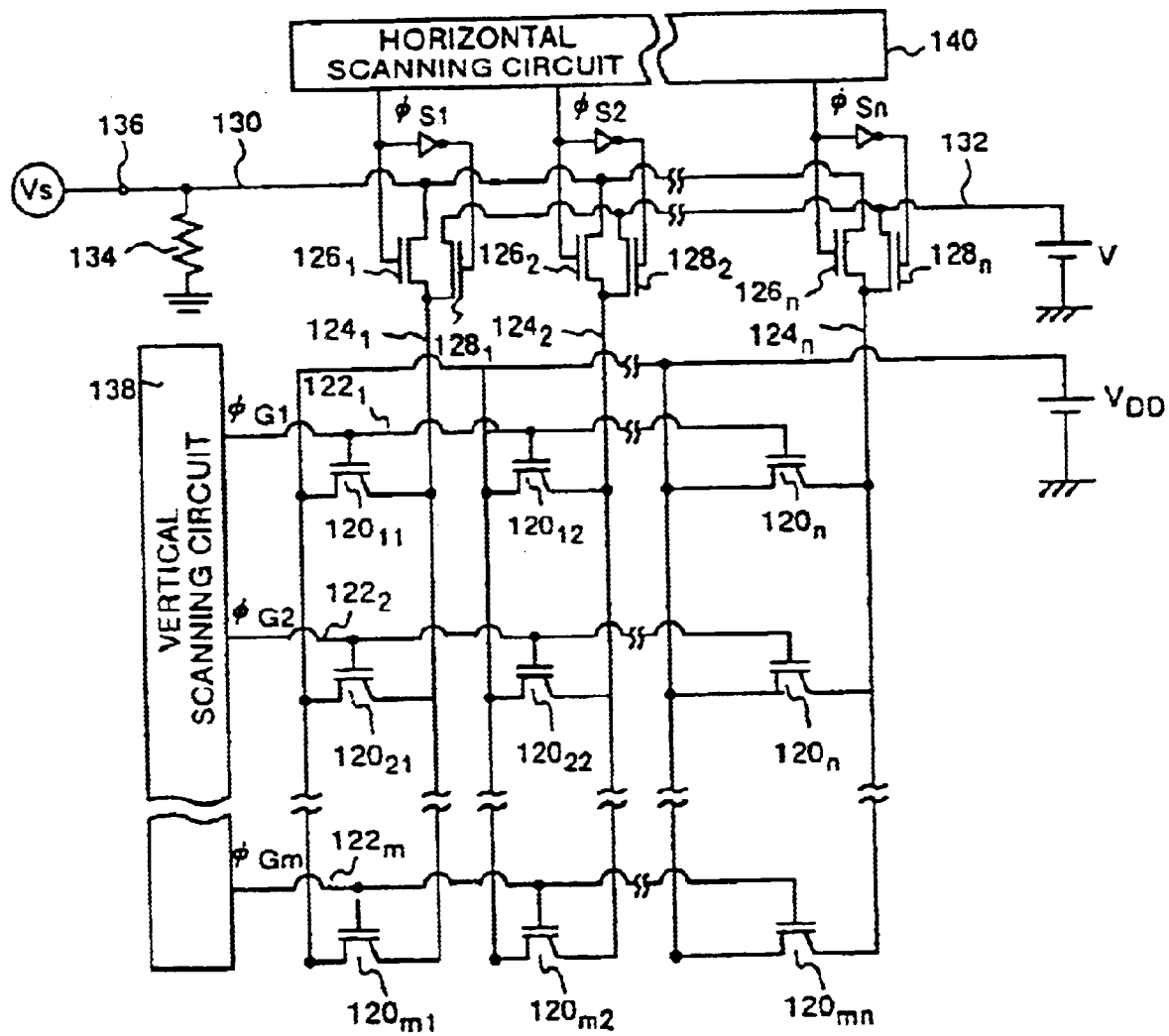
FIG. 12 is a view showing configuration of the image processor based on the conventional technology.

In FIG. 8, designated at the reference numeral 34 is a memory capacitor inside a pixel, at 35 a vertical transfer path, at 36 a transfer gate, and at 37 a horizontal transfer path. It should be noted that electrodes in the vertical transfer path 35 and horizontal transfer path 37 are not shown in FIG. 8. In FIG. 9, the reference numeral 38 indicates a transfer electrode for the vertical transfer path 35, and the reference numeral 39 is a transfer electrode for connecting between the vertical transfer path 35 and the horizontal transfer path 37.

Description is made hereinafter for the operation of this embodiment with reference to FIG. 8 and FIG. 9. At first, in the processing of computing for projection, signal charges accumulated in each of the memory capacitors 34 inside a pixel for pixels are concurrently transferred from all the pixels to the vertical transfer path 35 at the timing of FIG. 9A. It should be noted that, in the ordinary processing of CCD, namely in the processing of outputting signal data for each pixel, in this state, the charge is vertically transferred one stage after another in the direction from A to B. In FIG. 9, although only two pieces of transfer electrodes 38 are provided in each stage for convenience of description, in the actual case three or four phases are desirably provided therein in order to perform the ordinary processing.

To obtain a result of computing for projection in a column direction after the signal charge is transferred to the vertical transfer path 25, a voltage is concurrently loaded to the transfer electrode 38 as well as to the transfer electrode 39 so that, as shown in FIG. 9B, for instance, a potential in the vertical transfer path 35 is equivalent to that in the horizontal transfer path 37 linked thereto in each column.

In this state, the signal charge in each column is averaged through the vertical transfer path 35. In this case, however, even in the state of FIG. 9A, the charge is distributed as far as the vertical transfer path in which the electric charge has not been able to enter, therefore, the capacity of each transfer path becomes large. As described above, the potential is changed to about a half due to the averaged signal charge in provision of, for example, a two-phase driven electrode as compared to that in the processing of reading out one pixel. Therefore, through the same operation as the ordinary operation of CSD, namely, as shown in FIG. 9C, by sweeping the averaged wall in the left side to the right side of each transfer path and reducing the capacity of all the transfer paths, control is provided so that the ratio between signal charge and capacity in the processing of reading out each pixel is equivalent to that in the processing of reading out a result of computing for projection.

Then, as shown in FIG. 9D, by setting the transfer electrode 39 for connecting between the vertical transfer path 35 and the horizontal transfer path 37 to an OFF state, each result of computing for projection is stored in the horizontal transfer path 37 in each column respectively. Herein, when the horizontal transfer path 37 is driven in the same manner as that in the ordinary processing of CCD, namely when charge is horizontally transferred one stage by one stage, each result of computing for projection in the column direction can successively be read out.

On the other hand, in order to obtain a result of computing for projection in the horizontal direction, only signal charge for one row in FIG. 8 is transferred to the vertical transfer path 35, and the charge is lead to the horizontal transfer path 37 through the same operation as the ordinary processing of CSD. Then, when the same driving is performed as that of FIGS. 9A to 9D in the horizontal transfer path 37, a result of computing for projection in the row can be read out. By repeating this processing for each row, each result of computing for projection in the row direction can successively be read out.

It should be noted that, in this embodiment, as sweeping in the horizontal direction, configuration with the horizontal transfer path 37 of CCDs is used, but, for example, an amplifying MOS transistor 14 and a switching MOS transistor 12 may be provided therein as shown in FIG. 1. In this case, the processing shown in FIG. 9D is not needed.

As described above, in accordance with the present invention, a result of computing for projection to be obtained is an average of pixel values in the unit pixel circuits constituting each row and column, so that, as is in the conventional type, an output level when a gradation signal (pixel value) is read out from a pixel is not largely different from that when a result of computing for projection is read out and the current value in the result of computing for projection does not become extremely large. As a result, power consumption can largely be reduced as compared to that of the conventional type.

In accordance with another aspect of the present invention, for example, when a result of computing for projection in a row direction forming an array is read out, an electric charge is accumulated in an optoelectronic transducer due to the incident light, and an output potential generated due to the electric charge is changed. The potential amplified by a buffer circuit is stored in a memory for a unit pixel circuit according to the output potential. Then, all the corresponding pixel values are read out to an output line under the control of a switching circuit corresponding to the row direction. It should be noted that, in the processing for reading out a result of computing for projection, namely in the processing for compressing a two-dimensional image by the computing for projection, this pixel-value read-out processing is performed in all the unit pixel circuits at the same time, and at this point of time, the charge is re-distributed on the output line, so that a result of the computing for projection as an average of pixel values in unit pixel circuits can be obtained.

With this operation, it is not required to suppress the difference between the output level when a gradation signal (pixel value) is read out from each unit pixel circuit and that when a result of the computing for projection is read out, therefore, the types of power units (such as a low-potential power unit) need not be increased. In addition, access is made to all the unit pixel circuits at the same time to average potentials, which allows linearity of 'amount of light'× 'number of pixels' to be improved.

In accordance with another aspect of the present invention, an offset of an optoelectronic transducer and a memory for a unit pixel circuit is accurately carried out, so that reliability of pixel values can be enhanced.

In accordance with another aspect of the present invention, by controlling an image-data read circuit, a pixel value of each unit pixel circuit stored in the memory capacitor for a read circuit and a result of computing for projection of each row and each column can be read out any times until new data is stored therein. Both of the output levels are equivalent to each other, so that types of power units are not required to be increased.

In accordance with another aspect of the present invention, an offset of the memory capacitor for a read circuit is accurately carried out, and further the a memory for a read circuit can be insulated from an output line, so that reliability of image data to be read out can be enhanced.

In accordance with another aspect of the present invention, a difference between a specified reference value and image data for a current frame can be obtained, so that the offset in output of pixels can be removed by using two memory capacities for a read circuit, and as a result, output fluctuation among pixels can be suppressed. In addition, a difference between image data for a previous frame and that for a current frame can be obtained, so that a result of computing for projection can also be subjected to time differentiation.

In accordance with another aspect of the present invention, an average of pixel values (image data) in all the unit pixel circuits can be outputted as a result of computing an average value. Therefore, the amount of computations required, for example, when an optimal output gain is adjusted from the average value of an amount of light incident upon an image-pickup surface and when an accumulation time is optimized can largely be reduced by a circuit provided in the later stage, namely by DSP or the like.

In accordance with another aspect of the present invention, a difference between a specified reference value and a result of computing for projection of all the pixels in a current frame can be obtained, so that the offset in a result of computing the average value of all the pixels can be removed by using two memory capacities for a read circuit. In addition a difference between a result of computing for projection of all the pixels in a previous frame and that in a current frame can be obtained, so that a result of computing for projection can also be subjected to time differentiation.

In accordance with another aspect of the present invention, it is possible, for example, to make image data to output a result of computation in which weights are assigned to pixels have a gain twice as much. Therefore, an equivalent result to one-dimensional filtering processing can be obtained, so that the data in a state where filtering is performed can be outputted.

In accordance with another aspect of the present invention, in the processing of computing for projection, signal charge (potential) is re-distributed on an output line, so that even the case of 100×100 pixels, for example, substantially only a time spent for 100×2 pixels is required (because computation for projection for 100×100 rows can be performed at a time, and then computation for projection for 100×100 columns can be performed at a time), therefore, a read-out time required for the processing of computing for projection can be speeded up.

In accordance with another aspect of the present invention, in the processing of reading out a pixel value for each pixel, buffered pixel values are read out directly to an output line without execution of processing for storing the value in the memory capacitor for a unit pixel circuit, so that a time required for the processing of reading out a two-dimensional image can be speeded up.

In accordance with another aspect of the present invention, the obtained result of computing for projection is an average of the signal charges stored in the memory capacitor constituting each row and each column, so that, as is in the conventional type, an output level when a gradation signal (pixel value) is read out from a pixel is not largely different from that when a result of computing for projection is read out, and a current value in the result of computing for projection does not become extremely large. As a result, power consumption can largely be reduced as compared to that of the conventional type.

Thus, in accordance with the present invention, it is possible to provide an image processor which can equalize an output level to a level of power consumption between the ordinary processing of outputting a two-dimensional image projected onto an image sensor and the processing of outputting a result of computing for projection of the two-dimensional image.

This application is based on Japanese patent application No. HEI 10-365256 filed in the Japanese Patent Office on Dec. 22, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processor for selectively executing one of processing for outputting a two-dimensional image projected onto an image sensor, and averaging by re-distribution of electrical charge of the image sensor produced by the two-dimensional image, said image processor comprising:

a plurality of transducer units that accumulate electrical charge for each pixel in response to incident light arranged in an array of rows and columns, each transducer unit outputting a signal corresponding to the electrical charge accumulated in said transducer units in response to incident light to output line; and a plurality of averaging units connecting said transducer units in each row and in each column for averaging the signals output from said transducer units, wherein said averaging units average the signals by re-distributing the electrical charge accumulated in said transducer units so that potentials of the signals output from the respective transducer units are equalized each of said transducer units includes a unit pixel circuit for outputting a pixel value based on the electrical charge accumulated in the respective transducer unit, and each of said averaging units includes a plurality of read circuits for reading out the pixel value of each unit pixel circuit, and discrete output lines connecting said unit pixel circuits in each row and in each column and the corresponding read circuit, so that averaging of electrical charge is carried out at each of said discrete output lines by re-distributing the electrical charge to said unit pixel circuits connected to the respective discrete output line.

2. The image processor according to claim 1, wherein:

each of said transducer units includes a memory capacitor for accumulating the electrical charge as a signal charge;

each of said averaging units includes a vertical transfer path having a CCD structure, arranged in each column for transferring the signal charge in the column and accumulated in the corresponding one of said memory capacitors in a vertical direction; and a horizontal transfer path having a CCD structure for reading out the signal charge from the vertical transfer path, wherein said horizontal transfer path outputs an average of the signal charges stored in said memory capacitors for each row and for each column.

3. An image processor for selectively (i) processing for outputting a two-dimensional image projected onto an image sensor and (ii) processing for compressing the two-dimensional image by computing for projection, said processor comprising:

a plurality of unit pixel circuits arranged in an array of rows and columns, each unit pixel circuit outputting a pixel value, in response to incident light, to an output line;

a plurality of read circuits, one of said read circuits being provided in each row and in each column, each of said read circuits selectively reading out a pixel value of each unit pixel circuit and a result of computing for projection for each row and for each column; and output lines respectively connecting unit pixel circuits in each row and in each column and the corresponding read circuit, wherein each of said unit pixel circuits comprises:

an optoelectronic transducer for generating electrical charge for each pixel in response to the incident light and changing an output potential according to the incident light, a buffer circuit for buffering the electrical charge produced by said optoelectronic transducer in response to the output potential, a pixel memory capacitor for storing a potential generated by the electrical charge buffered by said buffer circuit as the pixel value, and first and second switching circuits for selectively reading out the pixel value stored in said pixel memory capacitor to said output lines of the corresponding row and column, respectively, said first and second switching circuits being operated in computing for projection for each row and each column so that the electrical charge of said pixel memory capacitors for each row and each column is re-distributed on said output lines, and averages of pixel values of said unit pixel circuits in each row and in each column are computed.

4. The image processor according to claim 3 wherein each of said unit pixel circuits further comprises:

a first reset circuit for resetting said optoelectronic transducer; and a second reset circuit for resetting said pixel memory capacitor.

5. The image processor according to claim 4 wherein each of said read circuits comprises:

a read circuit memory capacitor for storing a pixel value for the unit pixel circuit as image data read out through the corresponding output line and a result of computing for projection for each row and each column; and an image-data read circuit for reading out image data stored in said read circuit memory capacitor.

6. The image processor according to claim 3 wherein each of said read circuits comprises:

a read circuit memory capacitor for storing a pixel value for the unit pixel circuit as image data read out through the corresponding output line and a result of computing for projection for each row and each column; and an image-data read circuit for reading out image data stored in said read circuit memory capacitor.

7. The image processor according to claim 6 wherein each of said read circuits further comprises:

a reset circuit for resetting said read circuit memory capacitor; and an image-data control circuit for controlling connection of the corresponding output line to said read circuit memory capacitor.

8. The image processor according to claim 6 including a plurality of said read circuit memory capacitors, each read circuit memory capacitor being connected in parallel with the corresponding output lines, wherein a difference between image data for a previous frame and for a current frame or a difference between a reference value and image data for a current frame is read out.

9. The image processor according to claim 6 having an output-line connection circuit for connecting said output lines to each other and re-distributing the electrical charge among said output lines when computing for projection in each row and each column, wherein a result of computing for projection obtained through re-distribution of the electrical charge among said output lines is an average of pixel values in all of said unit pixel circuits.

10. The image processor according to claim 9 including a plurality of projection memory capacitors, each projection memory capacitor storing a result of computing an average of all of the pixel values, wherein a difference between the average value of all of the pixel values in a previous frame and in a current frame or a difference between a specified reference value and the average value of all the pixel values in a current frame is read out.

11. The image processor according to claim 6 including a weight assigning circuit for assigning a positive or a negative weight to a pixel value stored in said read circuit memory capacitor, wherein by assigning a different weight to the image data for a particular row or column as well as to the image data for an adjacent row or column, respectively, a difference between the image data in front of and behind the image data for the particular row or column is emphasized.

12. The image processor according to claim 6 wherein:

in the computing for projection, all of said unit pixel circuits are concurrently driven, and a potential buffered according to an output potential of the optoelectronic transducer is stored in each of said pixel memory capacitors;

all of the pixel values are concurrently read out to one of said output lines, under control of said first switching circuit, for a corresponding one of the rows and columns;

a result of computing for projection averaged on one of said output lines is stored in a corresponding read circuit memory capacitor;

all of the corresponding pixel values are concurrently read out to the other of said output lines for the other of the corresponding rows and columns, under the control of said second switching circuit; and a result of computing for projection averaged on the other of said output lines is stored in a corresponding read circuit memory capacitor.

13. The image processor according to claim 6 wherein, in the processing of reading out a pixel value for each pixel, all of said unit pixel circuits are driven in a specified order and pixel values buffered according to an output potential of the optoelectronic transducer are successively read out to a corresponding output line, and output to an external device, in order, from the pixel value first stored in the corresponding read circuit memory capacitor.

* * * * *